United States Patent [19]
Pollinger et al.

[11] 3,768,598
[45] Oct. 30, 1973

[54] SIGNAL INDICATOR FOR RAILWAY VEHICLES HAVING DISC BRAKES

[75] Inventors: Hans Pollinger, Munich; Ernst Blaut, Minden, both of Germany

[73] Assignee: Knorr-Bremse GmbH, Munich, Germany

[22] Filed: Apr. 4, 1972

[21] Appl. No.: 241,022

[30] Foreign Application Priority Data
Apr. 29, 1971  Germany.................. P 21 21 162.1

[52] U.S. Cl. ............................. 188/1 A, 200/61.4
[51] Int. Cl. .......................................... F16d 66/02
[58] Field of Search................... 188/1 A; 200/61.4; 340/52 A

[56] References Cited
UNITED STATES PATENTS
| | | | |
|---|---|---|---|
| 1,696,985 | 1/1929 | Trobojevich ................ | 188/1 A UX |
| 2,126,661 | 8/1938 | Provinson .................... | 188/1 A UX |
| 2,251,615 | 8/1941 | Miehle ........................ | 188/1 A UX |

*Primary Examiner*—Duane A. Reger
*Attorney*—Edmund M. Jaskiewicz

[57] ABSTRACT

A railway vehicle having disc brakes is provided with an indicator which generates a signal when a predetermined wear occurs in a brake lining. A pressurized circuit including an indicator for generating a signal is connected to a housing centrally located at the periphery of the brake disc. The housing has control valves therein which control connection of the signal indicator with the atmosphere and with a source of pressure. The valves are actuated by sensor links pivotally connected to the housing and to brake lining holders so that upon the occurrence of a predetermined wear in a brake lining the sensor links engage actuation stems on the valves and cause the valves to disconnect the signal indicator from the source of pressure and connect the signal indicator to the atmosphere whereby a signal is generated.

8 Claims, 5 Drawing Figures

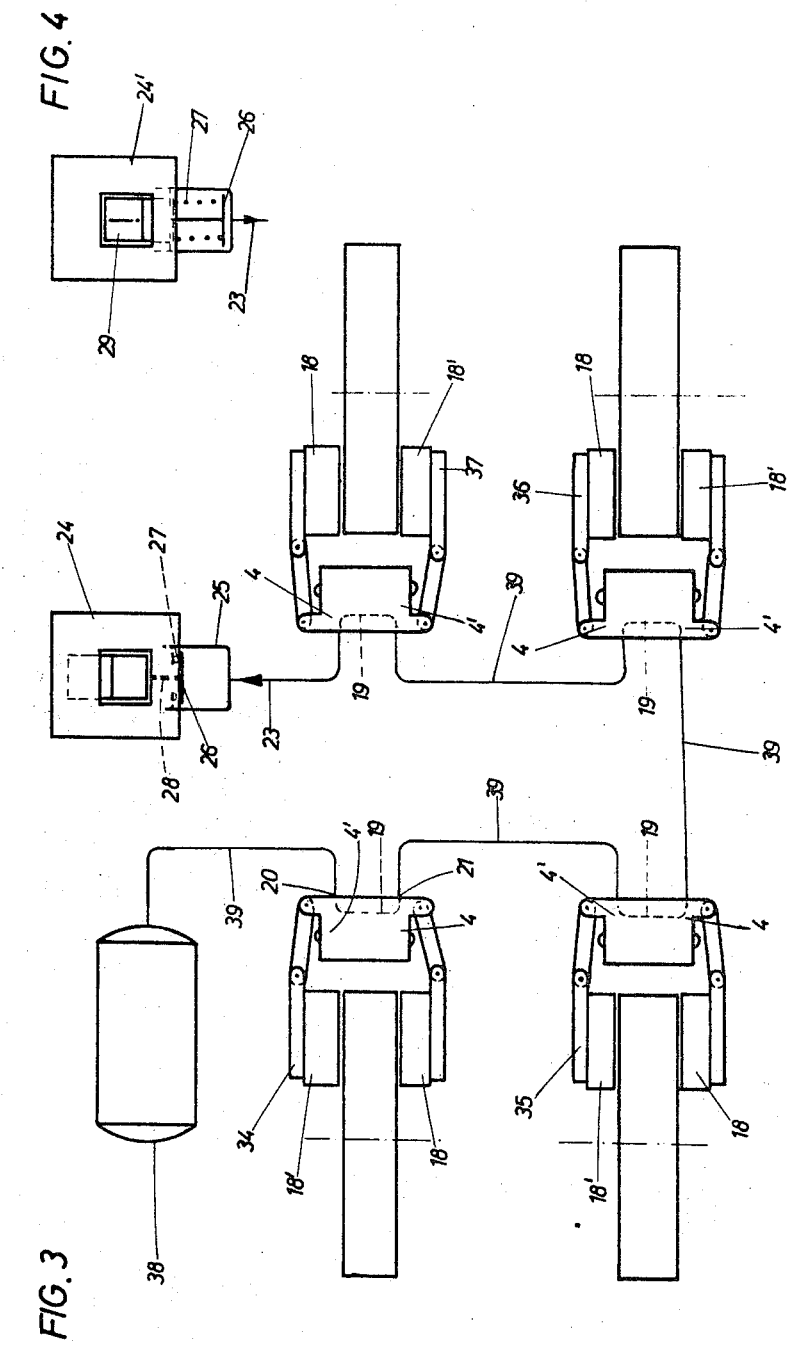

SIGNAL INDICATOR FOR RAILWAY VEHICLES HAVING DISC BRAKES

The present invention relates to signal indicators for vehicles equipped with disc brakes, more particularly, to railway vehicles wherein a signal is generated when a predetermined wear occurs in a brake lining.

Various forms of indicating devices have been proposed for generating a signal when a predetermined wear occurs in brake linings engageable with a brake disc. In one such device, an electrical contact is closed on the brake disc when the brake lining wear passes a predetermined amount and an optical signal is released by a suitable signal circuit. This indicator is disadvantageous in that damage may occur to the electrical contacts for closing the circuit or the contacts may be damaged because of high temperatures occurring during full braking operations. Since the contacts must be arranged in close proximity to brake linings these contacts may be soiled or eroded by dust or dirt generated by abrasion when the brake linings are in braking engagement with the brake disc. Such contacts have also been known to become inoperative because of icing conditions. These indicating devices also require a source of electric current which is generally available only in passenger vehicles or in propelled vehicles, such as locomotives. Such a source of electrical energy is usually not available in railway freight cars so that such signal devices are limited in their application.

In an attempt to overcome the disadvantages of the electrical signal indicators as described above indicating devices have been proposed wherein a small plate constructed as a noise generator is positioned in an open bore of the brake lining holder. The plate rests on the surface of the brake lining holder directed toward the brake lining. However, such signal devices have the disadvantage that after a relatively short time the open bore for retaining the plate is clogged by dust or dirt produced by abrading of the brake lining so that the resulting acoustic signal is weakened. Thus, the signal which is produced only when the railway vehicle is moving is drowned out by the various noises produced by the moving vehicle, particularly in the case of railway vehicles.

When such indicating devices become inoperative it is then necessary to examine all of the brake linings under the vehicles. This examination is a time consuming, dangerous and expensive procedure.

It is therefore the principal object of the present invention to provide a novel and improved signal indicator for brake lining wear in the disc brakes of vehicles, particularly, railway vehicles.

It is another object of the present invention to provide such a signal indicator which is not affected by dirt or icing and which is capable of providing reliable, maintenance-free operation over a long period of time.

It is a further object of the present invention to provide such a signal indicator which eliminates the necessity of examining individually the brake linings for wear.

The objects of the present invention are attained and the disadvantages of the prior art as described above are eliminated by the signal indicator disclosed as the present invention. The present signal indicator generates a signal when a predetermined wear occurs in the brake lining of disc brakes in a vehicle, and particularly a railway vehicle. The present invention essentially comprises a housing centrally located with respect to the periphery of a brake disc and having a pair of brake lining holders pivotally mounted on opposite ends of the housing so that brake linings are engageable with opposed sides of the brake discs. The holders are pivotally connected to the housing by linkage including a sensor device which is engageable with actuation stems of control valves within the housing. The valves control the state of pressure in a pressurized circuit interconnecting a source of pressure and a signal indicator.

When a predetermined wear occurs in a brake lining the sensor device will actuate a valve and actuation of the valve will disconnect the signal indicator from the pressurized source and connect the signal indicator with the atmosphere whereby a signal, which may be visual, is generated.

In a railway vehicle, wherein a brake disc is provided for each wheel mounted on the bogie, the valves may be connected in series to a pair of parallel connected signal indicators so that each indicator is responsive to the brake discs on one side of the bogie.

Other advantages and features of the present invention will be apparent upon reference to the accompanying description when taken in conjunction with the following drawings, which are exemplary, wherein;

FIG. 3 is a schematic representation of four indicating devices arranged on a bogie and their connection to a visual indicator;

FIG. 4 is a schematic representation of the indicator of FIG. 3 showing the indicator in position for generating a visual signal.

Preceeding next to the drawings, wherein like reference symbols indicate the same parts throughout the various views a specific embodiment and modifications of the present invention will be described in detail.

Figure 1:
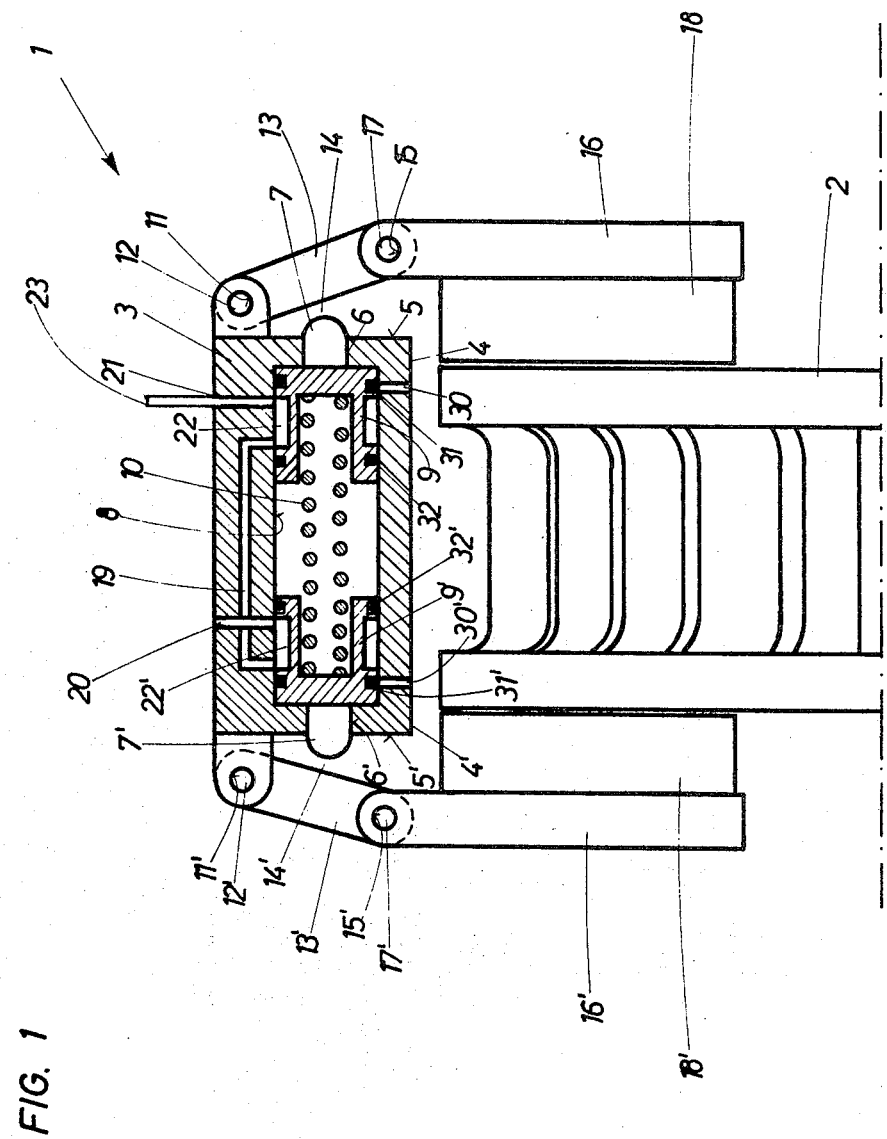
FIG. 1 is a sectional view through the device of the present invention in operating position with brake linings that are not worn.

As may be seen in FIG. 1 an indicator device indicated generally at 1 is amounted on a railway vehicle and comprises a housing 3 which is positioned centrally with respect to the periphery of a brake disc 2. On the side of the housing or frame 3 directed toward the brake disc two-way control valves 4 and 4' are positioned on each side of the brake disc in such a manner that their lateral surfaces 5 and 5' define the ends of the frame 3. The valves 4 and 4' are connected pneumatically in series. Bores 6 and 6' are provided in each of the ends 5 and 5' and actuation stems 7 and 7' are slideably positioned in these bores. The stems 7 and 7' are connected respectively to hollow valve members 9 and 9' slideably positioned in a common cylindrical bore 8 formed in the housing 3. The valve members 9 and 9' are axially displaceable with respect to each other and are urged away from each other by a compression spring 10 positioned therebetween.

The housing 3 is provided with the fixed portion of a transition passage 19 whose ends are turned inwardly, as may be seen in FIG. 1 to communicate with axially displaceable chambers 22 and 22' formed in the outer cylindrical faces of the valve members 9 and 9', respectively. The valve members 9 and 9' are sealed with respect to bore 8 by packings 31, 32 and 31', 32' respectively positioned near their outer ends at both ends of the annular chambers 22 and 22'.

One end of the passage 19 is connected through passage 20 to a source of pressure which is usually compressed air in the case of railway vehicles but not illustrated in this figure.

The other end of passage 19 is connected through chamber 22 by passage 21 to a signal line or conduit 23 to a signal indicator 24 illustrated in FIG. 4. The signal indicator 24 is of the visual or optical type which generates a visual signal, as known in the art, when predetermined brake lining wear occurs as will be presently described.

At each of the two outer ends 5 and 5' of the housing 3 there is provided a bearing bracket having bores 11 and 11' therein for receiving pins 12 and 12'. Side bar or sensor links 13 and 13' are pivotally connected to the pins 12 and 12' with the outer ends of the links being pivotally connected to pins 17 and 17' positioned in bores 15 and 15' of brake lining holders 16 and 16'. Brake linings 18 and 18' are mounted on each of the holders 16 and 16' as known in the art and are engageable with opposed surfaces of the brake disc 2.

When there is no wear in the brake linings 18 and 18', a predetermined distance or clearance 14 and 14' corresponding to the amount of permissable wear of the brake linings 18 and 18' is provided between the sensor links 13 and 13' and the actuation stems 7 and 7'.

The control valves 4 and 4' communicate with the atmosphere through bores 30 and 30' respectively which are positioned near the end walls 5 and 5' of the housing 3.

Pipe connection or bore 20, axially displaceable chambers 22 and 22' as well as the signal line 23 leading to the signal indicator 24 are connected to the source of pressure and thus define a pressurized circuit. Also, in this unworn state or condition of the brake linings, the ventilation bores 30 and 30' are closed by packings 31 and 31' on the hollow valve members 9 and 9'. The components thus described and illustrated in FIG. 1 are in their state of operational readiness when the linings are not worn.

Figure 2:
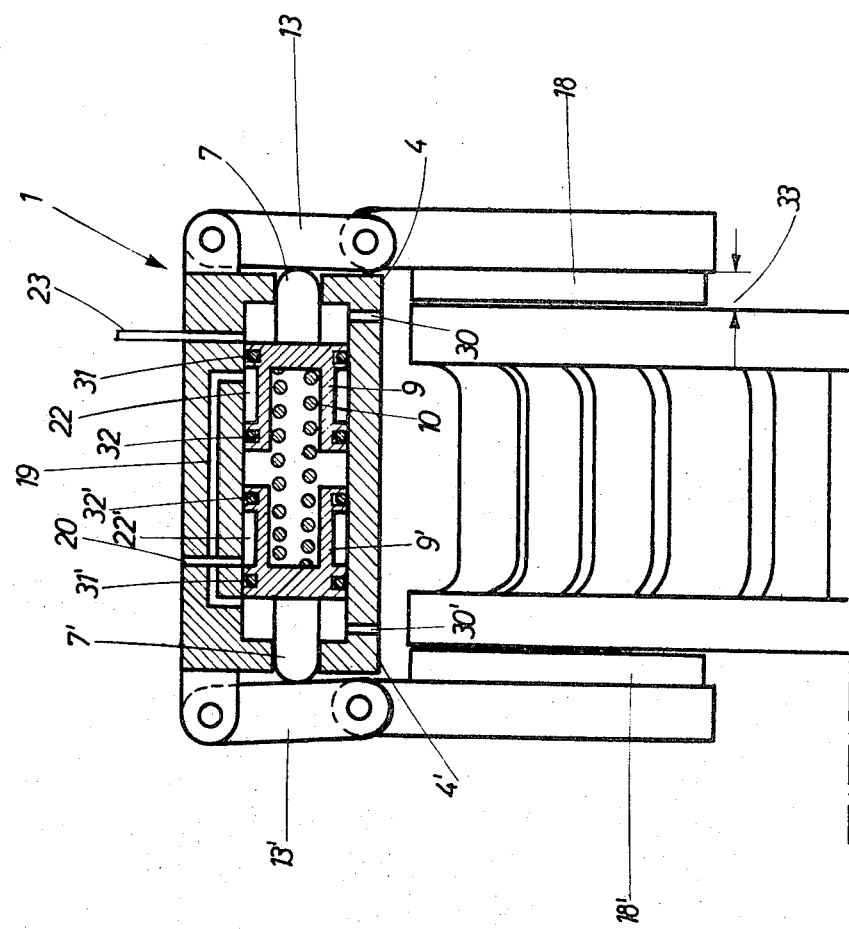
FIG. 2 is a view similar to that of FIG. 1 but shows the positioning of the indicator device with worn brake linings.

When brake linings 18 and 18' are worn uniformly as generally occurs under normal operating conditions, the components of the indicator are moved to the positions as illustrated in FIG. 2. When this predetermined amount of wear of the brake lining occurs, and the links 13 and 13' move through the previously established clearance 14 and 14', the sensor links 13 and 13' will engage the action stems 7 and 7'. Upon subsequent wear of the brake linings, the hollow valve members 9 and 9' are displaced axially toward each other against the force of compression spring 10 until a limit or predetermined amount of wear 33 is almost attained by the brake linings. In this state, a portion of the inner space of cylindrical bore 8 of valves 4 and 4' is already connected to the atmosphere through ventilation bores 30 and 30'. However, piston 26 of the visual indicator 24 of FIG. 3 is still connected to the source of pressure and the circuit remains pressurized. In this pressurized state, the piston 26 is held against the force of a compression spring 27 and thus indicates visually that the brake linings 18 and 18' have not yet reached a predetermined amount of wear as established by the limit indicated at 33.

If, upon further wear of the brake linings 18 and 18', the wear limit 33 is reached or the linings are worn below this limit, the sensor plates 13 and 13' will act upon the stems 7 and 7' to push the valve members 9 and 9' closer together until the switching position of FIG. 2 is attained. In this position, one end of transition line 19 is opened by the inward movement of valve member 9' and signal line 23 is opened by the inward movement of valve member 9. The transition passage 19 is then connected together with chamber 22 with the atmosphere through ventilation bore 30' of valve 4'. At the same time, the connection 20 together with moveable chamber 22' is disconnected from transition passage 19 and from the signal line 23. When the components of indicator 1 are in the position as shown in FIG. 2, the indicator is disconnected from the source of pressure and, as a result, compression spring 27 will urge piston 26 into its indicating position as shown in FIG. 4 thus generating a signal that the predetermined wear 33 of brake linings 18 and 18' has occurred and that the linings have been worn below this predetermined value.

Upon replacing of the brake linings 18 and 18' the several components of indicator 1 will return to their starting positions as shown in FIG. 1.

In FIG. 3, four indicating devices 34, 35, 36 and 37, each of which is similar to device 1 as described above, are mounted on a truck or bogie of a railway vehicle. All of the control valves 4 and 4' of each indicating device are connected pneumatically in series to a single visual indicator 24. In addition, the valves 4 and 4' of these indicator devices are connected by air line 39 to a compressed air reservoir 38 so that the indicator 24 and the indicator devices are all inter-connected in a pressurized circuit. From valve 4 of indicator device 37 the signal line 23 is connected to a cylinder 25 of the visual indicator 24 whose piston 26 is subjected to the compressed air pressure in the circuit against the force of compression spring 27. The components in FIG. 3 are all illustrated as being in an operating position.

In operation, if brake linings 18 and 18' of indicator device 35 are the first ones to be worn below their limit as indicated at 33 in FIG. 2, then valve 4' of indicator device 35 would disconnect the pressure in reservoir 38 and valve 4 would evacuate compressed air line 39 leading to valve 4' of indicator device 36 to the atmosphere. In addition, signal line 23 and cylinder 25 are also connected through indicator device 37 to the atmosphere so that the compression spring 27 moves piston 26 of the indicator 24 to its indicating or end position as shown in FIG. 4. A piston rod 28 is connected to a visual warning sign 29 which indicates that worn brake linings 18 and 18' must be replaced. In a similar manner the wearing of the brake linings in the indicating device 34, 36 and 37 to a predetermined amount will cause a similar operation of the circuit and actuation of the visual indicator 24.

In a modification of the invention wherein indicator devices 1 are placed on all of the wheels of a truck of a railway vehicle, all of the valves 4 and 4' on that truck are connected pneumatically in series to a pair of visual indicators 24 which are pneumatically connected in parallel with each other. Each of the signal indicators 24 is operated in accordance with the indicator devices on one side of the bogie.

Figure 5:
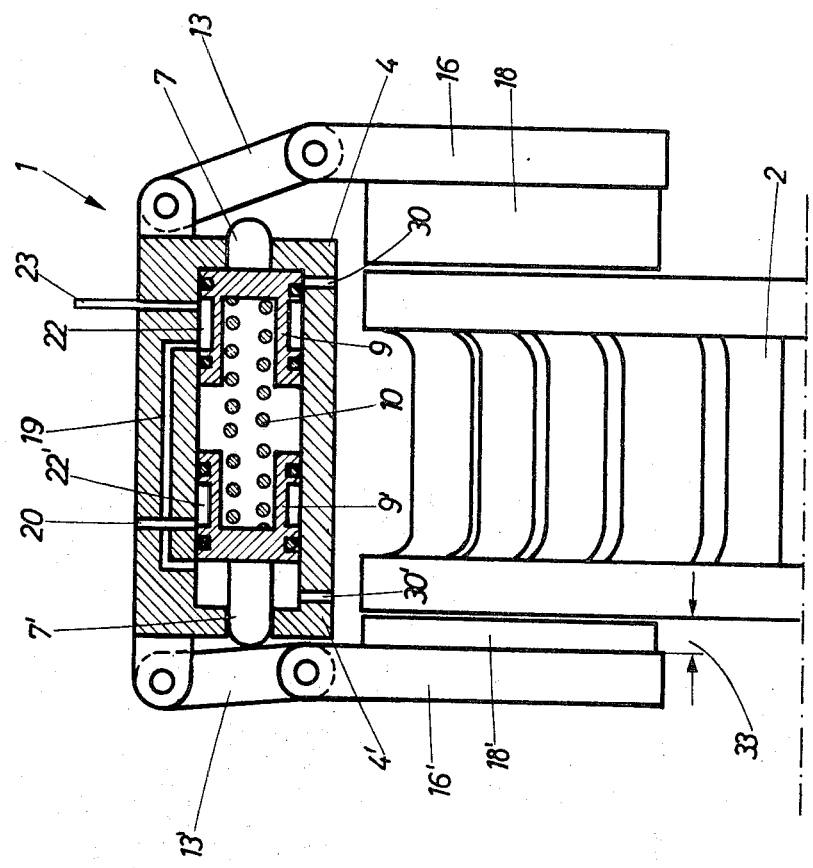
FIG. 5 is a view similar to that of FIG. 1 but showing the positioning of the device with brake linings which are worn unequally.

It may also occur that the brake linings 18 and 18' may wear unevenly as illustrated in FIG. 5. In FIG. 5 an unworn lining 18 is supported on brake lining holder 16 of valve 4 while brake lining holder 16' associated with valve 4' supports a brake lining 18' which has already been worn below its predetermined limit 33. Sensor link 13' thus depresses actuation stem 7' to move the hollow valve member 9' inwardly against the force of the hollow compression spring 10 into a position corresponding to the amount of predetermined wear 33. This movement of valve member 9' shuts off the reservoir pressure by connecting annular chamber 22' with the connection 20. At the same time, transition passage 19 is connected to the atmosphere through the bore 30' and also connects annular chamber 22 and signal line 23 to the atmosphere. The drop of pressure in cylinder 25 of visual indicator 24 causes the compression spring 27 to move the piston 26 downwardly into its visual end position.

Where the positions of the worn brake linings are reversed, ie brake lining 18 is worn and brake lining 18' is not worn, then the hollow valve member 9 will be moved to the left by means of sensor link 13 engaging the actuation stem 7. The movement of the valve member 9 axially toward the left will shut off the reservoir pressure by communicating passage 19 with the chamber 22.

A signal line 23 and accordingly the visual indicator 24' of FIG. 4 will be connected to the atmosphere through bore 30 whereby a warning signal will be optically provided at 29.

As a further modification the control valves 4 and 4' which are illustrated as essentially slide or gate valves may be replaced by a two-way valve. The functions of the two-way valves will then correspond to the functions performed by the control valves 4 and 4' as described above.

Thus it can be seen that the present invention has provided a simple yet effective indicator for generating a signal when a predetermined amount of wear has occured in the brake linings of a disc brake. While this embodiment of the invention has been described essentially as applied to a railway vehicle it is to be understood that other forms of vehicles provided with disc brakes could also be equipped with this indicator device of the invention.

The indicator will generate accurately a signal upon the wear of only one brake lining or when the brake linings wear at an unequal rate and the wear of one lining exceeds the predetermined limit. The resulting indicator reliably performs under all operating conditions encountered on the rail-roads and is not adversely affected by dirt.

It will be understood that this invention is susceptible to modification in order to adapt it to different usages and conditions, and accordingly, it is desired to comprehend such modifications within this invention as may fall within the scope of the appended claims.

What is claimed is:

1. In an indicator which generates a signal when predetermined wear occurs in the brake lining of disc brakes in a vehicle, the combination of a control valve comprising a pair of valves with valve members therein moveable in opposite directions and a compression spring therebetween, a pair of holders mounted on said vehicle and supporting brake linings on opposed sides of a brake disc, actuation stems on said valve members extending outwardly of said control valve in opposite directions, first means on said control valve for connecting to a source of pressure and second means thereon for connecting to a signal indicator, said control valve having a first opening to the atmosphere associated with said first connection means and a second opening to the atmosphere associated with said second connection means, said first and second connecting means and said first and second openings defining a pressurized circuit interconnecting said valve and a signal indicator, said valves controlling said first and second connecting means and said first and second openings so that actuation of at least one valve disconnects said second means from said source of pressure and connects said second means to the atmosphere, and sensor device means engageable with said valve actuation stems and actuated by a said holder when predetermined brake lining wear occurs for actuating said valves to vary the state of pressure in said circuit whereby a signal is generated by the signal indicator.

2. In an indicator as claimed in claim 1 and a housing at the periphery of the brake disc and said pair of valves being in said housing, passage means in said housing connecting said first opening to said second opening, and a signal indicator connected to said second connecting means.

3. In an indicator as claimed in claim 1 and comprising a housing at the periphery of the brake disc and mounted on said vehicle in a position centrally located at the periphery of the brake disc.

4. In an indicator as claimed in claim 1 wherein said sensor device means comprises links pivotally mounted on each side of said control valve and pivotally connected to said brake lining holders, said links being engageable with said valve actuation stems.

5. In an indicator as claimed in claim 4 wherein said links are spaced from their respective actuation stems a predetermined distance when said brake linings are not worn.

6. In an indicator as claimed in claim 1 wherein said valves are connected in series with said signal indicator.

7. In an indicator as claimed in claim 1 wherein said vehicle is a railway vehicle.

8. In an indicator as claimed in claim 7 and comprising a plurality of said brake discs and a corresponding plurality of said housings and associated pairs of valves and brake lining holders mounted on a bogie of the railway vehicle, a pair of signal indicators connected in parallel with said indicators being associated respectively with both sides of said bogie, said plurality of pairs of valves being connected in series with said signal indicators.

* * * * *